United States Patent
Muramatsu et al.

(10) Patent No.: US 6,954,249 B2
(45) Date of Patent: Oct. 11, 2005

(54) LIQUID CRYSTAL DISPLAY DEVICE, METHOD OF MANUFACTURING THE SAME, AND ELECTRONIC EQUIPMENT

(75) Inventors: Eiji Muramatsu, Toyoshina-machi (JP); Shigetoshi Yamada, Hotaka-machi (JP); Minoru Ikegami, Toyoshina-machi (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 09/202,107

(22) PCT Filed: Apr. 21, 1998

(86) PCT No.: PCT/JP98/01804

§ 371 (c)(1), (2), (4) Date: Mar. 8, 1999

(87) PCT Pub. No.: WO98/48321

PCT Pub. Date: Oct. 29, 1998

(65) Prior Publication Data

US 2002/0060767 A1 May 23, 2002

(30) Foreign Application Priority Data

Apr. 21, 1997 (JP) .............................................. 9-103711
Apr. 21, 1997 (JP) .............................................. 9-103712

(51) Int. Cl.$^7$ .......................................... G02F 1/1345
(52) U.S. Cl. ...................................... 349/149; 349/151
(58) Field of Search ................................ 349/149–152; 345/211

(56) References Cited

U.S. PATENT DOCUMENTS

| | | | | |
|---|---|---|---|---|
| 4,385,292 A | * | 5/1983 | Nonomura et al. .......... 340/719 |
| 4,392,718 A | * | 7/1983 | Morrison ..................... 350/336 |
| 4,570,115 A | | 2/1986 | Misawa et al. |
| 4,625,084 A | * | 11/1986 | Fowler et al. ................ 200/11 |
| 5,289,301 A | * | 2/1994 | Brewer ......................... 345/87 |
| 5,517,344 A | | 5/1996 | Hu et al. ...................... 349/153 |
| 5,606,194 A | | 2/1997 | Lebrun et al. ............... 257/433 |
| 5,736,973 A | * | 4/1998 | Godfrey et al. .............. 345/102 |
| 5,754,268 A | * | 5/1998 | Aihara et al. ................ 349/155 |
| 5,876,106 A | * | 3/1999 | Kordecki ...................... 362/29 |

FOREIGN PATENT DOCUMENTS

| | | |
|---|---|---|
| JP | 53-151385 | 4/1952 |
| JP | 52-27398 | 3/1977 |

(Continued)

OTHER PUBLICATIONS

Chinese Examination Result in counterpart application citing above document.

(Continued)

*Primary Examiner*—Dung Nguyen
(74) *Attorney, Agent, or Firm*—Harness, Dickey & Pierce, P.L.C.

(57) ABSTRACT

In a liquid crystal display device for displaying a visible image by controlling the alignment of a liquid crystal disposed between a pair of transparent substrates (1a, 1b), a resistance element (8, 13, 18, 28, 40) for changing a voltage which will be imposed in the liquid crystal is directly formed on the transparent substrate (1a) by ITO or the like. One or ones of the resistance branches (8a) of a resistance pattern (8) are cut off by a laser beam to thereby change the resistance value of the resistance pattern (8) so that a voltage which will be imposed on the liquid crystal is adjusted. A peripheral circuit including a capacitor and/or the like may be directly formed on the transparent substrate (1a) in addition to the resistance pattern (8). The peripheral circuit may be formed to a portion located between the pair of transparent substrates (1a, 1b). The shape of the liquid crystal display device as a whole can be reduced by the formation of the resistance element and other peripheral circuit on the substrate of a liquid crystal panel.

26 Claims, 10 Drawing Sheets

FOREIGN PATENT DOCUMENTS

| | | | |
|---|---|---|---|
| JP | 64-32602 | * | 2/1989 |
| JP | 04 250415 | | 7/1992 |
| JP | 07-270751 | | 10/1995 |
| JP | 8-148313 | * | 6/1996 |
| JP | 08 313935 | | 11/1996 |
| WO | WO97/06465 | | 2/1997 |

OTHER PUBLICATIONS

PF926–01, Epson SED 1565 Series, Dot Matrix LCD Driver, Seiko Epson Corporation, Dec. 1996, pp. 1–17.

Morris, John R., Interconnection and Assembly of LCDs, AMLCDs, 1995, pp. 66–71.

Hwang, Jackson C., Advanced Low–Cost Bare–Die Packaging Technology for Liquid Crystal Displays, 1994 IEEE/CPMT Int'l Electronics Manufacturing Technology Symposium, pp. 199–202.

Communication from EPO re counterpart Application No. 98 914 103.1–2205.

Examination Result corresponding to European Application No. 98 914 103.1–2205.

SED1565 Series, Rev. 1.2, EPSON, pp. 8–1 to 8–85.

SED 1560/½Technical Manual (Preliminary), SMOS Systems, Inc., Oct. 1996, Version 3.0 (Preliminary), pp. 1–84.

Communication from European Patent Office re: counterpart application.

* cited by examiner

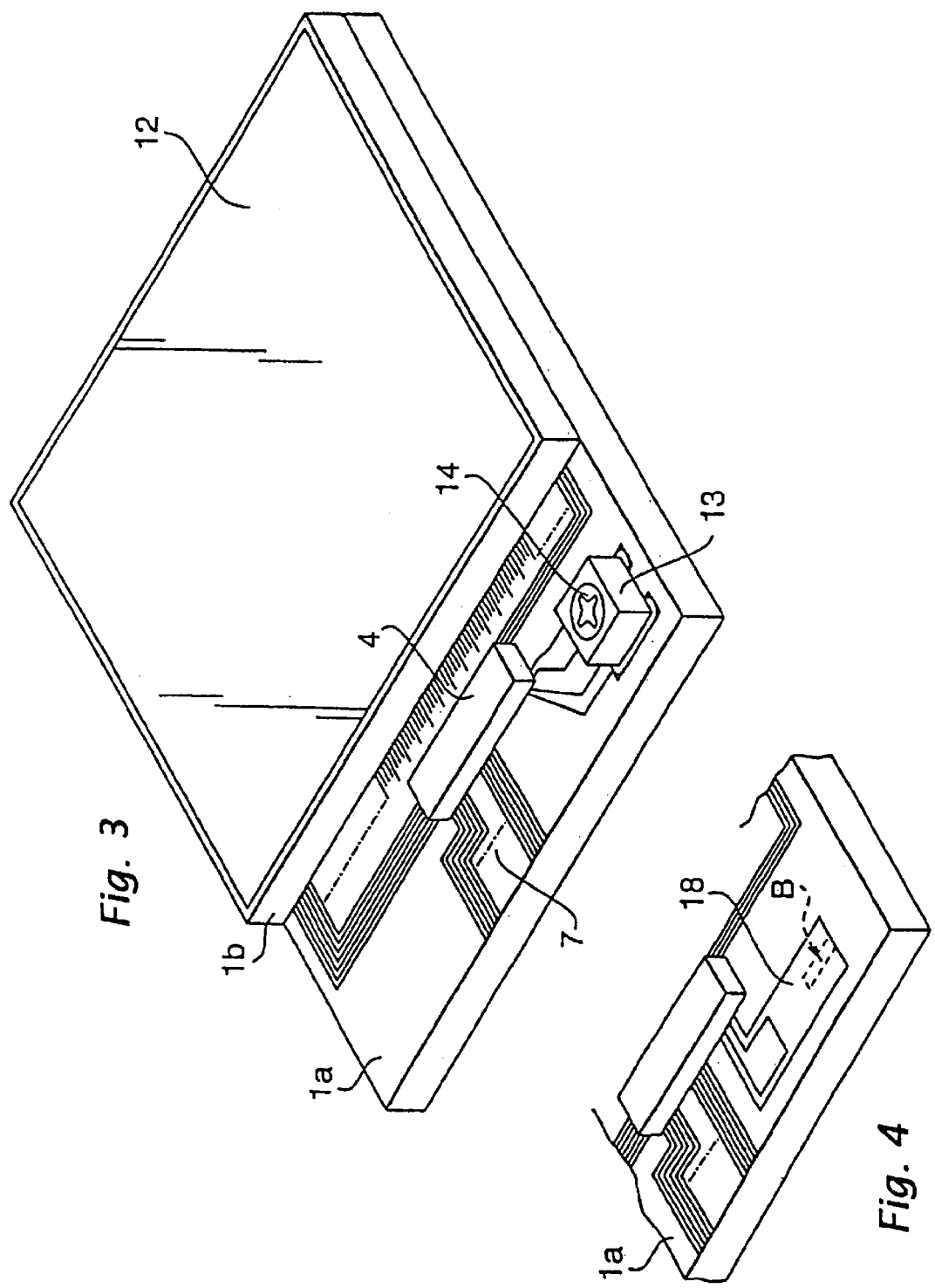

LIQUID CRYSTAL DISPLAY DEVICE, METHOD OF MANUFACTURING THE SAME, AND ELECTRONIC EQUIPMENT

TECHNICAL FIELD

The present invention relates to a liquid crystal display device for displaying a visible image such as a character, a numeral and the like by modulating light by controlling the alignment of a liquid crystal. Further, the present invention relates to a method of manufacturing the liquid crystal display device. In addition, the present invention relates to electronic equipment using the liquid crystal display device.

BACKGROUND ART

Recently, liquid crystal display devices have been widely used as a visible image displaying portion of various types of electronic equipment such as a video camera and the like. The liquid crystal display device modulates light by controlling the alignment of a liquid crystal depending upon whether a prescribed voltage is imposed thereon or not to thereby display a visible image such a character, a numeral and the like.

In general, the liquid crystal display device is arranged such that one pixel is formed by a liquid crystal partitioned to a dot shape and a visible image display region is formed by disposing a plurality of the pixels to a matrix shape. Then, the visible image is displayed making use of contrast of light produced depending upon whether a prescribed voltage is imposed or not on each of the respective liquid crystals which form the respective pixels. To obtain optimum contrast in this case, the voltage imposed on each liquid crystal must be maintained to a prescribed value which is optimum to the liquid crystal.

In an ordinary liquid crystal display device, a liquid crystal driving IC is mounted on a liquid crystal panel and when an output voltage of a host equipment side, for example, a portable telephone, is imposed on the external input terminal of the liquid crystal driving IC, a voltage which will be imposed on a liquid crystal appears to the output terminal of the liquid crystal driving IC. However, the characteristics of liquid crystal driving ICs may be dispersed depending upon conditions under which they are manufactured and the characteristics of liquid crystal panels may be also dispersed. The following two methods are contemplated to impose an optimum voltage on each of the liquid crystals forming respective pixels even if such dispersion arises.

First, there is contemplated a method of adjusting a voltage imposed on a liquid crystal to a prescribed value by adjusting a voltage supplied from host equipment to a liquid crystal driving IC. Another method is such that a resistance element is additionally connected to the liquid crystal driving IC and a voltage imposed on the liquid crystal is adjusted to a prescribed value by adjusting the resistance value of the resistance element while maintaining the voltage supplied from the host equipment to a given value.

Taking into consideration an actual situation that a liquid crystal display device is finished as a product in a state that a liquid crystal driving IC is mounted on a liquid crystal panel, it is preferable that the output voltage of host equipment supplied to the liquid crystal display device is adjustable. Actually, however, the method in which the adjusting of the voltage is performed in the liquid crystal display device while maintaining the voltage supplied from the host equipment to the given value has been widely used.

Conventionally, when a voltage is not adjusted on a host equipment side but adjusted on a liquid crystal display device side, an FPC (flexible printed circuit) or a transit PCB (printed circuit board) is connected to the external connecting terminal of a liquid crystal panel and a resistance element is mounted on the FPC or the transit PCB and an operating voltage which will be supplied to a liquid crystal driving IC is changed by the action of the resistance element.

However, the conventional liquid crystal display device having the resistance element mounted on the FPC or the transit PCB has a problem that an additional area or space is required on the FPC or the like to mount the resistance element thereon and, as a result, the liquid crystal display device is increased in size accordingly.

In particular, when there is taken into consideration a liquid crystal display device of a type having a liquid crystal driving IC(s) directly mounted on one or both of a pair of light transmitting substrates having a liquid crystal sandwiched therebetween, that is, a liquid crystal display device of a COG (chip on glass) system, the liquid crystal display device has a great advantage that it does not especially require a large FPC, transit PCB and the like because the liquid crystal display device equips the liquid crystal driving IC(s) on the transparent substrate(s). Therefore, concerning the liquid crystal display device of the COG type, in case the FPC or the transit PCB is additionally mounted on the liquid crystal display device wittingly in order to add a resistance element, the advantage of the liquid crystal display device is greatly reduced by it.

Incidentally, what is additionally connected to the liquid crystal driving IC is not limited to the resistance element and there is a case that a peripheral circuit including a resistance element, a capacitor and the like is disposed on the liquid crystal driving IC to assist the operation thereof. The capacitor is provided because of the following two reasons.

(1) Voltages imposed on respective liquid crystals corresponding to respective pixels in a liquid crystal panel appear to the output terminals of a liquid crystal driving IC. In the ordinary liquid crystal display devices, in order to impose desired voltages on only the liquid crystals of desired pixels and not to impose a voltage on the liquid crystals of the pixels disposed around the above pixels, it is insufficient only to impose a single pulse voltage on a scanning electrode and a signal electrode, and multi-stage pulse voltages must be properly superimposed and imposed thereon. To impose the multi-stage pulse voltages on the respective pixels as described above, the multi-stage pulse voltages must be individually output to the output terminals of the liquid crystal driving IC. In this case, if the respective pulse voltages are unstable, there is a possibility that noise arises and the quality of display of the liquid crystal display device is adversely affected by the noise. To solve this problem, capacitors are connected in parallel between respective voltage levels from which the multi-stage pulse voltage outputs are originated.

(2) A general liquid crystal driving IC needs $V_{DD}=+3V$ to drive a logic system circuit and $V_{ss}=GND$ for grounding and further $V_{LCD}=-6V$ to drive a liquid crystal display device. Depending upon a type of the liquid crystal driving IC, there is a liquid crystal driving IC provided with three input terminals separately for the three potentials or a liquid crystal driving IC of a system which is provided with only input terminals corresponding to $V_{SS}=GND$ and $V_{DD}=+3V$ and creates $V_{LCD}=-6V$ in the interior thereof. When the liquid crystal driving IC of the system for creating $V_{CLD}$ from $V_{SS}$ and $V_{DD}$ is used, a voltage increasing circuit including a capacitor must be additionally provided as a peripheral circuit around the liquid crystal driving IC.

Conventionally, when a peripheral circuit including a resistance element and a capacitor is additionally provided with a liquid crystal driving IC, the FPC or a transit PCB is connected to a liquid crystal panel and the peripheral circuit is amounted on the transit PCB or the like. Further, Japanese Laid-open No. 8-43845 and Japanese Laid-Open No. 8-43846 disclose a technology for directly mounting a capacitor on a substrate of a liquid crystal display device.

However, when the peripheral circuit is mounted on the transit PCB or the like, the area of the transit PCB or the like must be increased accordingly and further a large space must be prepared. Thus, there is a problem that the overall dimension of the liquid crystal display device is increased. In addition, a job for assembling the peripheral circuit on the transit PCB or the like is troublesome.

Further, when the peripheral circuit is directly mounted on the substrate of the liquid crystal display device as disclosed in Japanese Laid-open No. 8-43845 and the like, since the area of the projecting portion of the substrate must be increased accordingly, there is also a problem that the overall dimension of the liquid crystal display device is increased.

An object of the present invention is made in view of the above problems arisen when a resistance element is additionally connected to a liquid crystal driving IC and also the above problem arisen when a peripheral circuit including a capacitor and the like is additionally connected to a liquid crystal driving IC. It is the object of the present invention to maintain a small overall dimension of a liquid crystal display device even if a resistance element is additionally connected to a liquid crystal driving IC or even if a peripheral circuit including a capacitor and the like is additionally connected to the liquid crystal driving

SUMMARY OF THE INVENTION (1) To achieve the above object, a liquid crystal display device according to the present invention for displaying a visible image by controlling the alignment of a liquid crystal disposed between a pair of substrates by imposing a voltage on the liquid crystal is characterized in that a resistance element having an adjustable resistance value is disposed on at least one of the pair of substrates to change the voltage imposed on the liquid crystal.

According to the liquid crystal display device, even if a voltage supplied from host equipment to the liquid crystal display device is fixed to a given value, a voltage imposed on the liquid crystal in the liquid crystal display device can be adjusted to a prescribed value which is suitable to operate the liquid crystal with optimum contrast by adjusting the resistance value of the resistance element disposed on the substrate. Further, since the resistance element is directly mounted on the substrate, an FPC or a transit PCB need not be used, whereby an increase of the overall dimension of the liquid crystal display device can be avoided.

The liquid crystal display device is embodied in various types such as a TAB system, a COG system and the like. The liquid crystal display device of the TAB system is such that a liquid crystal driving IC is mounted on a film carrier tape using a TAB (Tape Automated bonding) technology and the film carrier tape is conductively connected to a liquid crystal panel using a connecting material such as an ACF (anisotropic conductive tape) or the like. On the other hand, the liquid crystal display device of the COG system is such that the liquid crystal driving IC is directly mounted on at least one of a pair of light transmitting substrates having a liquid crystal disposed therebetween.

Since the liquid crystal display device of the COG system has the liquid crystal driving IC directly mounted on the light transmitting substrate of the liquid crystal panel, it basically has an advantage that a large FPC or the like need not be attached to the outside of the liquid crystal panel. Therefore, the direct formation of the resistance element on the substrate as disclosed in the present invention in the liquid crystal display device of the COG system agrees with a target of the COG system which intends to form the overall dimension of a liquid crystal display device as small as possible because an accessory such as the film carrier tape need not be willingly prepared.

The "resistance element having an adjustable resistance value" used in the present invention is not limited to a resistance element having a specific structure and, for example, a resistor capable of changing a resistance value by moving a slide contact between a plurality of fixed contacts, that is, a so-called potentiometer can be used. In addition, since electrodes are generally formed on substrates by ITO (indium tin oxide), the resistance element can be also formed by the same ITO.

In this case, the ITO as the resistance element is previously set to a low resistance value and a proper portion thereof is partially removed as desired to thereby obtain a desired resistance value. The removal of the resistance element can be achieved by, for example, irradiating a laser beam to the resistance element. Since the simultaneous formation of the resistance element with the electrodes omits a process dedicated for the formation of the resistance element, a manufacturing cost can be suppressed to a low level.

(2) Next, a method of manufacturing a liquid crystal display device according to the present invention for displaying a visible image by controlling the alignment of a liquid crystal disposed between a pair of substrates by imposing a voltage on the liquid crystal is characterized by comprising the steps of mounting a resistance element having an adjustable resistance value on at least one of the pair of substrates and adjusting the voltage imposed on the liquid crystal to a prescribed value by adjusting the resistance value of the resistance element.

According to the manufacturing method, since an additional element such as the FPC or the like is not necessary when the resistance element is additionally connected, the overall dimension of the liquid crystal display device can be reduced.

(3) Next, a liquid crystal display device according to the present invention for displaying a visible image by controlling the alignment of a liquid crystal disposed between a pair of substrates is characterized in that a peripheral circuit is formed to a portion sandwiched between the pair of substrates.

According to the liquid crystal display device, since the peripheral circuit is formed to the region sandwiched between the pair of substrates making effective use of the region and the peripheral circuit is not formed to the projecting portion of the substrate, the area of the substrate can be made as small as possible. Further, an additional element such as the transit PCB or like is not necessary to assemble the peripheral circuit. As a result, the liquid crystal display device can be reduced in size. Since the peripheral circuit is formed simultaneously with a liquid crystal panel in a process for manufacturing the liquid crystal panel, a process for assembling the peripheral circuit need not be separately executed after the completion of the liquid crystal panel, whereby a manufacturing cost can be reduced.

In an ordinary liquid crystal display device manufacturing process, a seal material is annularly formed to any one of a pair of substrates and one of the substrates is put on and bonded to the other substrate through the seal material. Since the thus formed liquid crystal display device has liquid crystal sealed into the inside region thereof surrounded by the seal member, when the present invention is applied to the thus arranged liquid crystal display device, it is preferable to dispose the peripheral circuit to a region outside of the seal material. With this arrangement, the liquid crystal is prevented from entering onto the peripheral circuit, whereby the stability of the peripheral circuit can be maintained.

In the aforesaid liquid crystal display device, the peripheral circuit can be surrounded by a second seal material. With this arrangement, the peripheral circuit can be prevented from being scratched by the bending of the substrate at a portion confronting the peripheral circuit.

The liquid crystal display device is embodied in the various types such as the TAB (Tape Automated bonding) system, the COG (chip on glass) system and the like as described above. The liquid crystal display device of the TAB system is such that a liquid crystal driving IC is mounted on a film carrier tape using the TAB technology and the film carrier tape is conductively connected to a liquid crystal panel using the connecting material such as the ACF (Anisotropic Conductive Film) and the like.

On the other hand, the liquid crystal display device of the COG system is such that a liquid crystal driving IC is directly mounted on at least one of a pair of light transmitting substrates having a liquid crystal disposed therebetween. When the peripheral circuit is formed between the pair of substrates as disclosed in the present invention, the area of the projecting portion of the substrate is not unnecessarily increased and further an additional element such as the transit PCB or the like need not be used, whereby a particular advantage can be obtained.

In the liquid crystal display device of the present invention, the peripheral circuit may be arranged as a circuit including a resistance element and/or a capacitor. The type of the peripheral circuit is not limited to a special type so long as the peripheral circuit can be formed on the substrate. When the resistance element is used as the peripheral circuit, the resistance element can be formed by a carbon printed resistor. When the capacitor is used as the peripheral circuit, a voltage output from the liquid crystal driving IC can be stabilized and the occurrence of noise can be prevented. Further, a voltage having a new voltage value can be generated by increasing an external voltage imposed on the liquid crystal driving IC.

(4) Next, electronic equipment according to the present invention is electronic equipment including a liquid crystal display device according to the present invention. The electronic equipment includes at least the liquid crystal display device, a power supply for supplying power to the liquid crystal display device and a controller for controlling the operation of the liquid crystal display device. There can be contemplated, for example, a portable telephone, a video camera and other various types of electronic equipment as the electronic equipment.

BRIEF DESCRIPTION OF THE DRAWINGS

FIG. 3 is a perspective view showing another embodiment of the liquid crystal display device according to the present invention.

FIG. 4 is a perspective view showing still another embodiment of the liquid crystal display device according to the present invention and, in particular, a main portion thereof.

BEST MODE OF CARRYING OUT THE INVENTION (First Embodiment)

Figure 1:
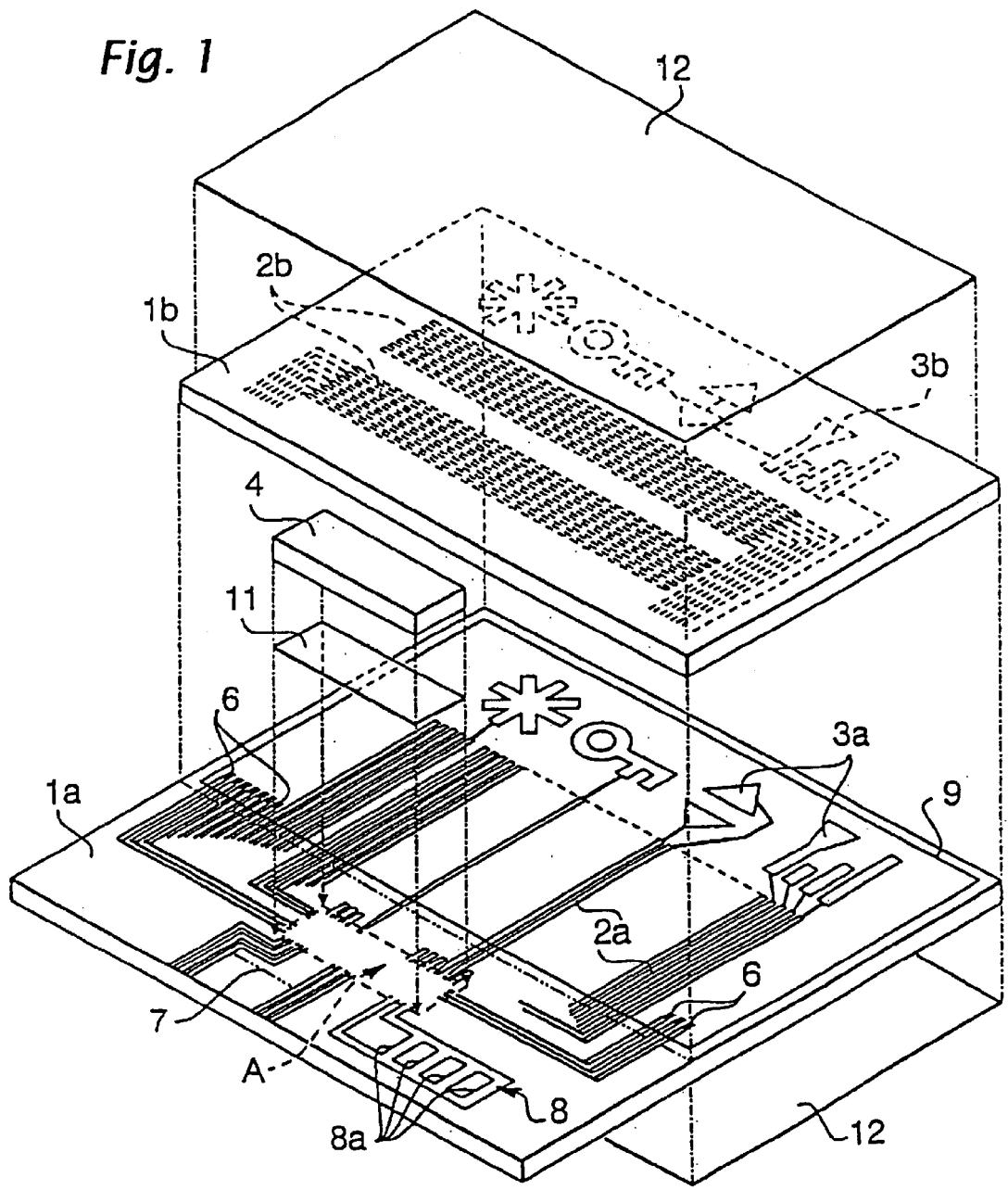
FIG. 1 is an exploded perspective view showing an embodiment of a liquid crystal display device according to the present invention.

FIG. 1 shows an embodiment of a liquid crystal display device according to the present invention. The liquid crystal display device is a liquid crystal display device of a passive matrix system in which an active element is not used and further a liquid crystal display device of a COG system in which a liquid crystal driving IC is directly mounted on a substrate.

The liquid crystal display device includes a transparent substrate $1a$ as a light transmitting substrate and another transparent substrate $1b$ which is paired with the transparent substrate $1a$. These transparent substrates are formed of glass, plastic or the like. Stripe-shaped electrodes $2a$ and pattern electrodes $3a$ having special shapes are formed on the surface of one of the transparent substrates $1a$ by ITO (indium tin oxide). Further, stripe-shaped electrodes $2b$ and pattern electrodes $3b$ are formed on the surface of the confronting substrate $1b$ by ITO likewise.

A region A on which a liquid crystal driving IC 4 is mounted is formed to the objecting portion of one of the transparent substrates $1a$ and the plurality of electrodes $2a$ and $3a$ of the transparent substrate $1a$ directly extend up to the region A, respectively. On the other hand, the plurality of the electrodes $2b$ and $3b$ of the transparent substrate $1b$ extend up to the IC mounting region A through upper/lower conductors 6 disposed on the transparent substrate $1a$, respectively.

External connecting terminals 7 are formed to the input terminals of the IC mounting region A by ITO to make conduction between them and an external circuit. Further, a resistance pattern 8 is formed by ITO to a position corresponding to the resistor connecting terminal of the liquid crystal driving IC 4. The resistance pattern 8 as an electric circuit lowers external voltages supplied from the external connecting terminals 7 in accordance with its resistance value and imposes the lowered voltages on the liquid crystal driving IC 4 as operation voltages. The external connecting terminals 7 and the resistance pattern 8 are formed simultaneously with the formation of the electrodes 2*a*, 3*a* on the transparent substrate 1*a*.

When the stripe-shaped electrodes 2*a*, the pattern-shaped electrodes 3*a*, the external connecting terminals 7 and the resistance pattern 8 are formed on one of the transparent substrates 1*a* and further the stripe-shaped electrodes 2*b* and the pattern-shaped electrodes 3*b* are formed on the other transparent substrate 1*b*, alignment films are further formed thereon and the respective transparent substrates are subjected to alignment processing, for example, lapping processing.

Thereafter, a seal material 9 is annularly formed on any one of the transparent substrates, for example, the transparent substrate 1*a* by screen printing and further spacers such as beads or the like are dispersed on the transparent substrate 1*a*. Then, the pair of transparent substrates 1*a*, 1*b* are superposed on each other in such a manner that the stripe-shaped electrodes 2*a* are perpendicular to the stripe-shaped electrodes 3*a* and the transparent substrates 1*a*, 1*b* are jointed to each other by the seal material 9.

Subsequently, liquid crystal is charged into a space formed between the transparent substrate 1*a* and the transparent substrate 1*b*, that is, a so-called cell gap. Further, the liquid crystal driving IC 4 is bonded to the IC mounting position A of the transparent substrate 1*a* using an ACF (anisotropic conductive film) 11 to thereby conductively connect the bumps of the liquid crystal driving IC 4 to corresponding electrode terminals.

With the above arrangement, a liquid crystal panel on which the liquid crystal driving IC 4 is mounted is formed. When external voltages each having a prescribed value are imposed on the external connecting terminals 7 and an output voltage obtained at the output terminal of the liquid crystal driving IC 4 is out of a prescribed voltage value set to the liquid crystal, any one of the resistance branches 8*a* of the resistance pattern 8 is cut off by a laser beam irradiated thereon to thereby adjust the voltage imposed on the liquid crystal in the liquid crystal panel to a value proper to the liquid crystal. Since a plurality of the resistance branches 8*a* are disposed in parallel with each other positionally and in series to each other electrically, one or a plurality of them are cut off as necessary.

Figure 2:
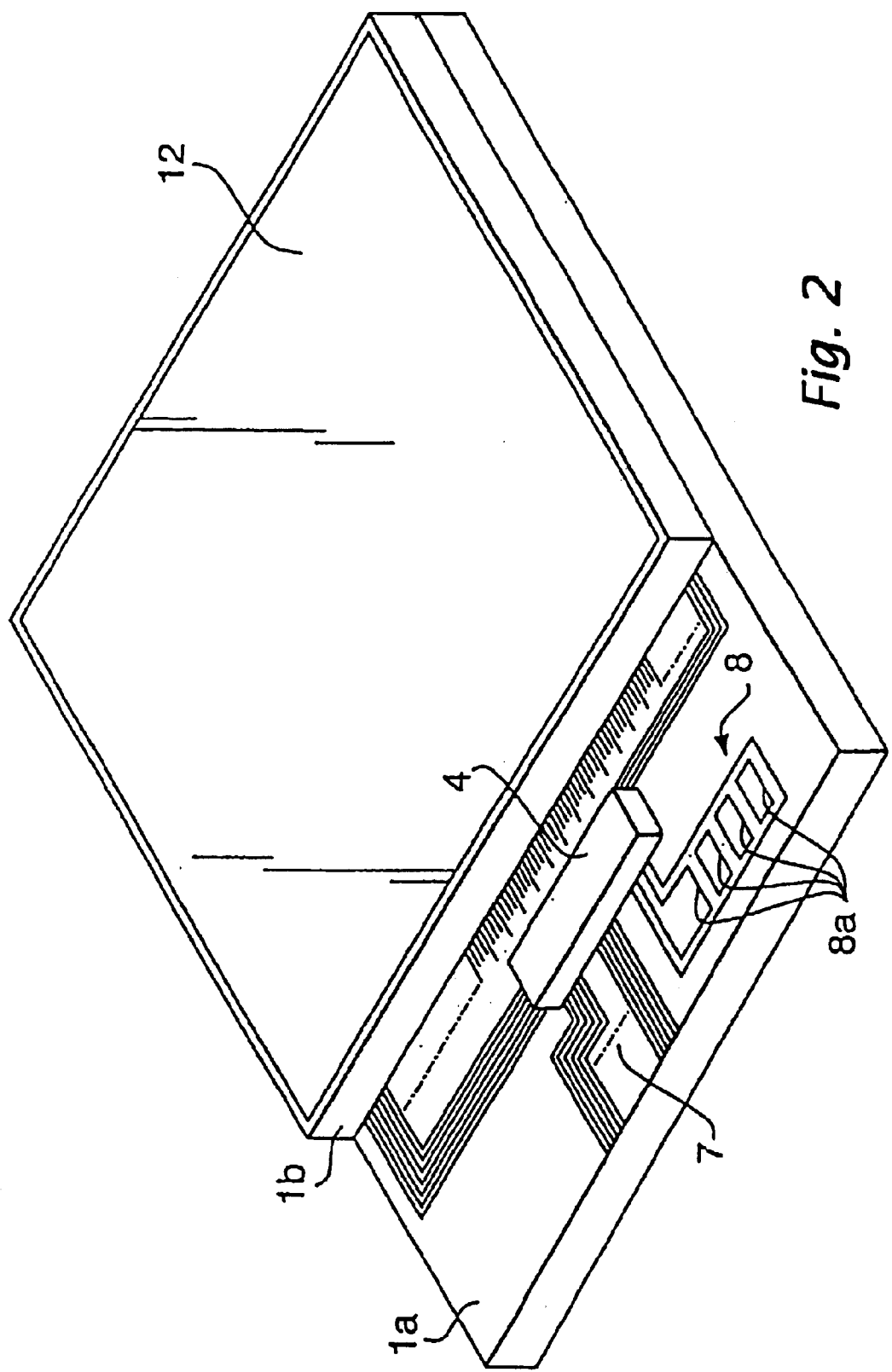
FIG. 2 is a perspective view showing a state after the embodiment shown in FIG. 1 is assembled.

Thereafter, polarizers are bonded to the outside surfaces of the transparent substrates 1*a*, 1*b* to thereby complete a liquid crystal display device as shown in FIG. 2. In the liquid crystal display device, a back light unit is attached externally of the transparent substrate 1*a* or the transparent substrate 1*b* when necessary. In the liquid crystal display device of the embodiment, since a resistance element added to the outside of the liquid crystal driving IC 4 is not indirectly connected to the liquid crystal panel through an FPC or the like but it is directly formed on the transparent substrate 1*a* of the liquid crystal panel, the overall dimension of the liquid crystal display device is not uselessly increased.

(Second Embodiment)

FIG. 3 shows another embodiment of the liquid crystal display device according to the present invention. The embodiment is different from the previous embodiment shown in FIG. 2 in that a potentiometer 13 is used in place of the ITO resistance pattern 8 as a resistance element disposed on a transparent substrate 1*a*. As known well, the potentiometer 13 is a resistance element capable of changing a resistance value between terminals by moving a slide contact between a plurality of fixed terminals by rotating a knob 14. In the embodiment, the potentiometer 13 is conductively connected to an electrode terminal on the transparent substrate 1*a* by soldering or other conductively connecting processing.

Although, in the liquid crystal display device of FIG. 2, the resistance value is adjusted by partly removing the resistance pattern 8 by the irradiation of the laser beam, the resistance value in the embodiment can be adjusted by rotating the knob 14 of the potentiometer 13 only a suitable angle. Since the potentiometer 13 is directly mounted on the transparent substrate 1*a* of a liquid crystal panel also in the embodiment, an indirect part such as an FPC or the like need not be used, whereby the overall dimension of the liquid crystal display device is not uselessly increased.

(Third Embodiment)

FIG. 4 is a perspective view showing still another embodiment of the liquid crystal display device according to the present invention and, in particular, a main portion thereof. In the embodiment, a resistance element is disposed on a transparent substrate 1*a* by a resistance pattern 18 formed by ITO likewise the embodiment shown in FIG. 2. However, the resistance pattern 18 used in the embodiment does not have the plurality of stages of the resistance branches 8*a* connected to each other in series which are shown in FIG. 2 and it is formed as a uniform rectangular resistance pattern. When the resistance value of the resistance pattern 18 is changed, the resistance pattern is partly removed by partly irradiating a laser beam to the uniform rectangular resistance pattern as shown by a broken line B. According to the embodiment shown in FIG. 4, the resistance value of the resistance pattern 18 can be changed steplessly, although the resistance value of the resistance pattern 8 in the embodiment shown in FIG. 2 is changed only stepwise.

(Fourth Embodiment)

Figure 5:
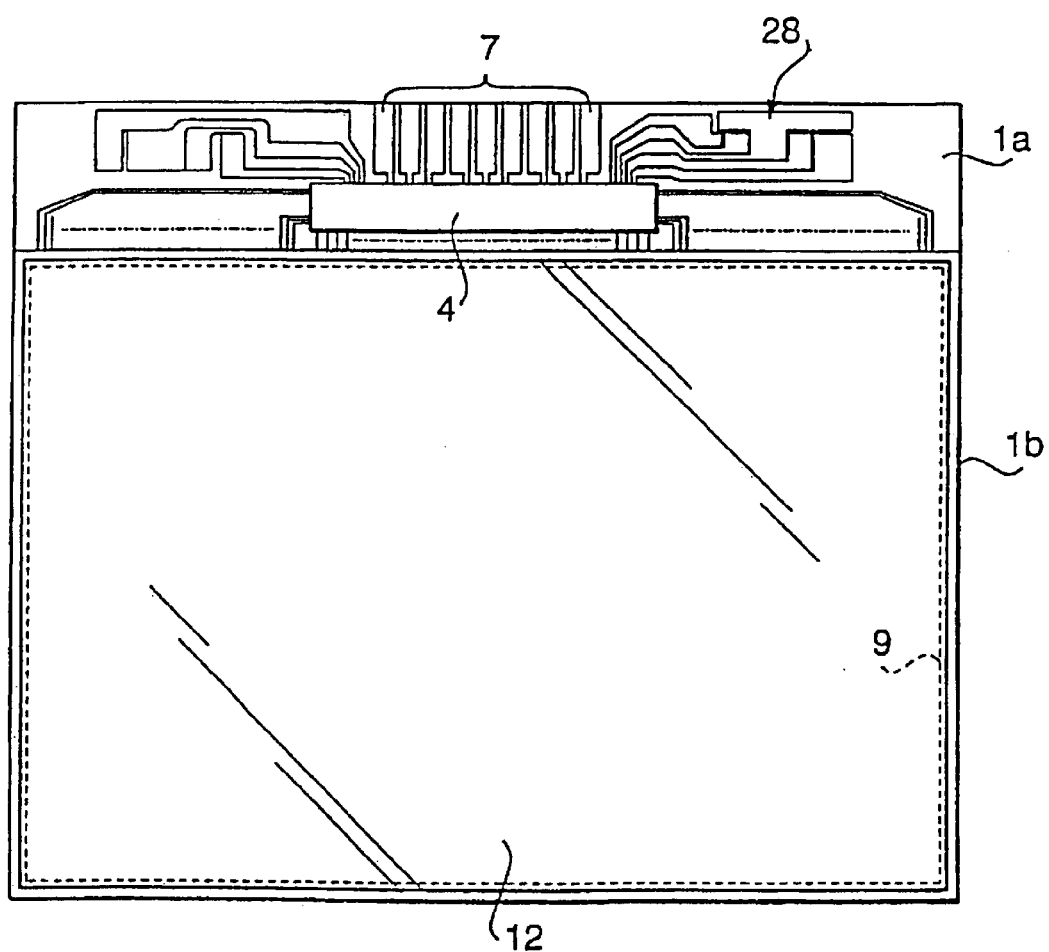
FIG. 5 is a plan view showing a further embodiment of the liquid crystal display device according to the present invention.

FIG. 5 is a plan view showing a further embodiment of the liquid crystal display device according to the present invention. The embodiment is arranged similarly to the previous embodiment shown in FIG. 1 in that a transparent substrate 1*a* is jointed to a transparent substrate 1*b* by a seal material 9, polarizers 12 are bonded to the outside surfaces of the transparent substrates 1*a*, 1*b*, a liquid crystal driving IC 4 is mounted on the objecting portion of the transparent substrate 1*a*, an external connecting terminal 7 is formed to a side end of the transparent substrate 1*a* and a resistance pattern 28 is formed to the objecting portion of the transparent substrate 1*a*.

Figure 6:
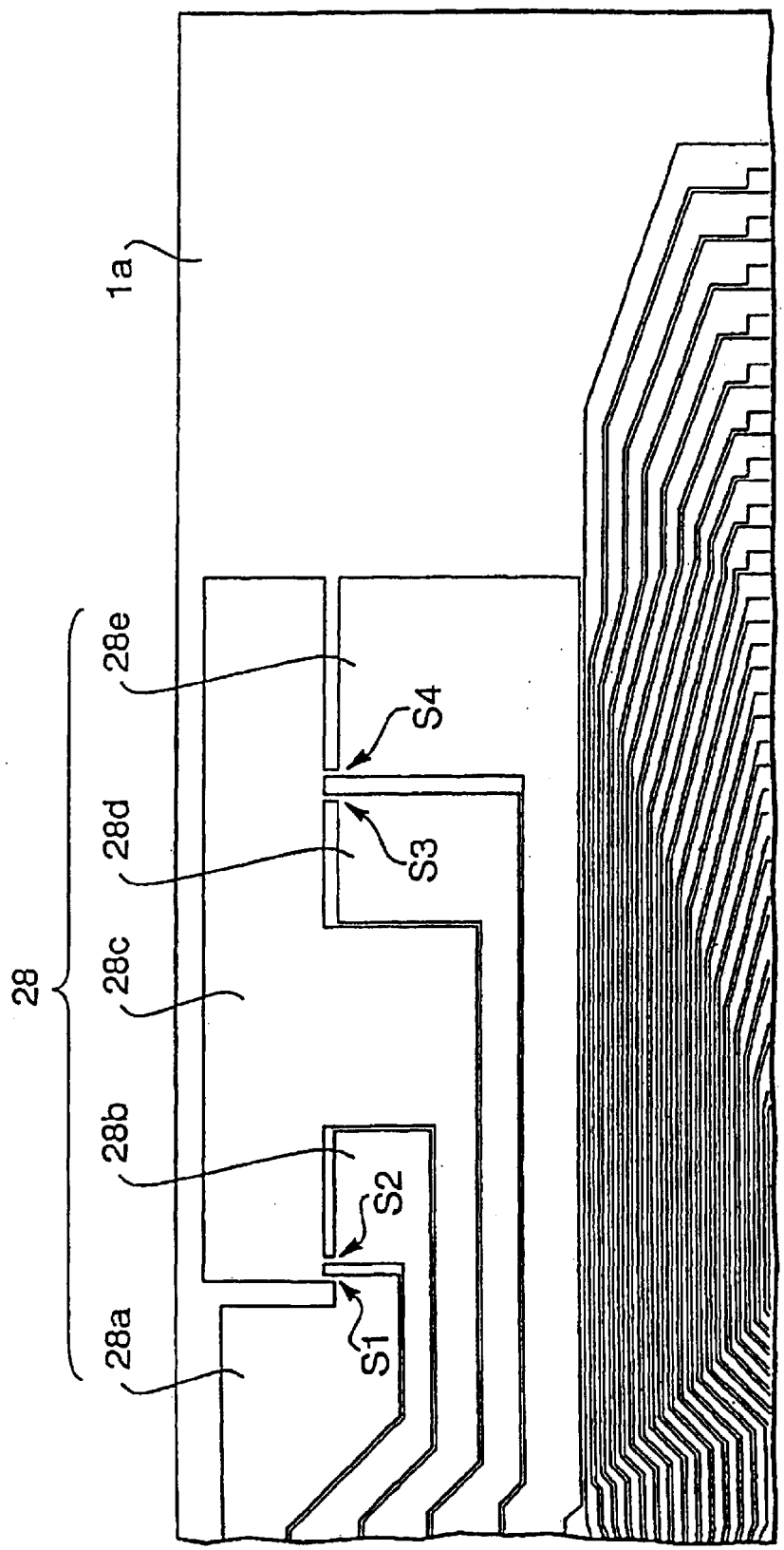
FIG. 6 is a plan view showing a main portion of the embodiment shown in FIG. 5 in an enlarged fashion.

The embodiment is different from the embodiment shown in FIG. 1 in that the resistance pattern 28 is modified, which will be specifically described below. As shown in FIG. 6, the resistance pattern 28 includes five resistance branches 28*a*–28*e* which are composed of the same material as that of the electrodes 2*a*, 3*a* (see FIG. 1) and formed simultaneously with them.

The resistance branch 28*c* is connected to the ground level of the liquid crystal driving IC 4, further the resistance branch 28*c* is connected to the resistance branch 28*a* through a narrow communication pattern S1, the ground resistance branch 28*c* is connected to the resistance branch 28*b* through a narrow communication pattern S2, the ground resistance branch 28*c* is connected to the resistance branch 28*d* through a narrow communication pattern S3 and the ground resistance branch 28*c* is connected to the resistance branch 28*e* through a narrow communication pattern S4.

Figure 7:
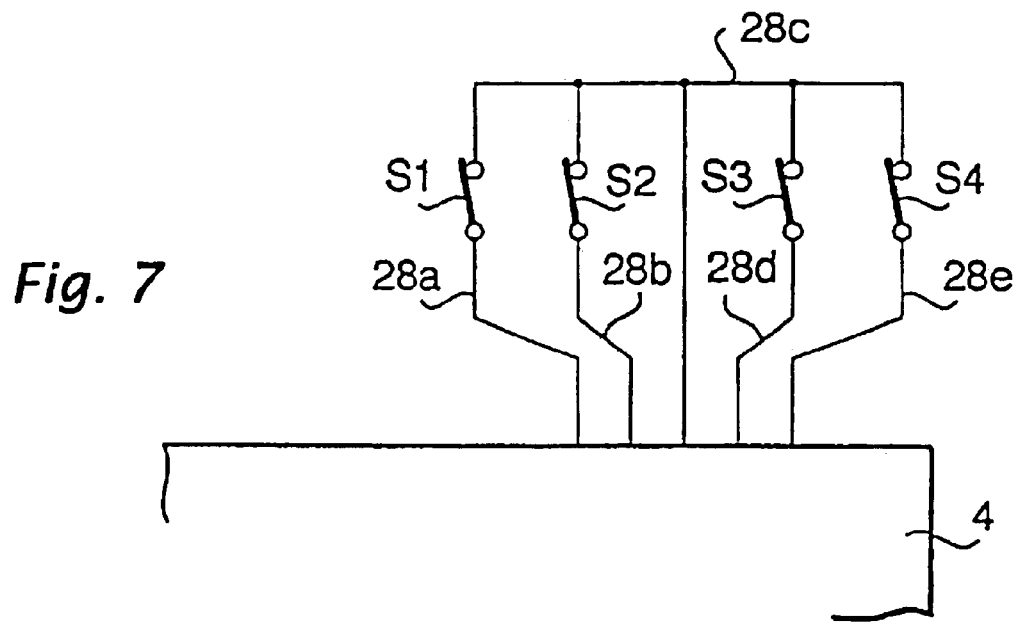
FIG. 7 is a view showing an equivalent circuit when the structure shown in FIG. 6 is electrically shown.

The respective communication patterns S1–S4 act as switching elements for intermittently connecting the ground resistance branch 28*c* to the respective resistance branches 28*a*, 28*b*, 28*d* and 28*e*. FIG. 7 shows them in an electrical circuit. When the liquid crystal display device is initially manufactured, since the respective communication patterns S1–S4 connect the resistance branches 28*a*–28*e* to each other, the respective communication patterns S1–S4 are turned on.

Since the respective resistance branches 28a–28e are connected to a resistor disposed in the liquid crystal driving IC 4, when any one of the communication patterns S1–S4 or a plurality of them combined suitably are selected and cut off, a suitable one or ones of the switches S1–S4 in FIG. 7 can be turned off. The communication patterns S1–S4 can be cut off by the irradiation of, for example, a laser beam.

Figure 8:
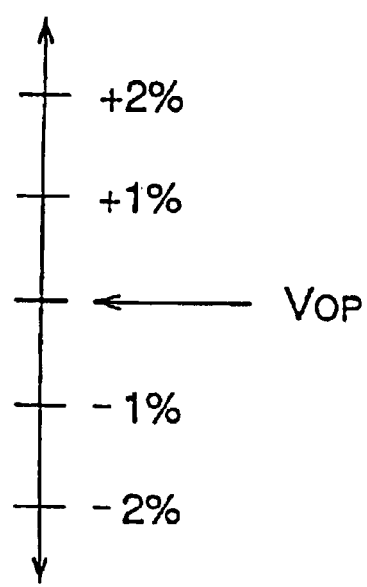
FIG. 8 is a view of an example showing how a voltage is changed when the equivalent circuit of FIG. 7 is used.

When a suitable one or ones of the communication patterns S1–S4 are selected and cut off, that is, when they are turned off, an operation voltage imposed on the liquid crystal driving IC 4 can be changed to a desired voltage value. For example, an operation voltage $V_{op}$ can be changed to four stages of +2%, +1%, −1% and −2% as shown in FIG. 8.

That is, the embodiment does not change the respective resistance branches 28a–28e so that they have target resistance values, but uses them as the switching elements and changes resistance values by controlling ON and OFF of the switching elements of them.

(Fifth Embodiment)

Figure 9:
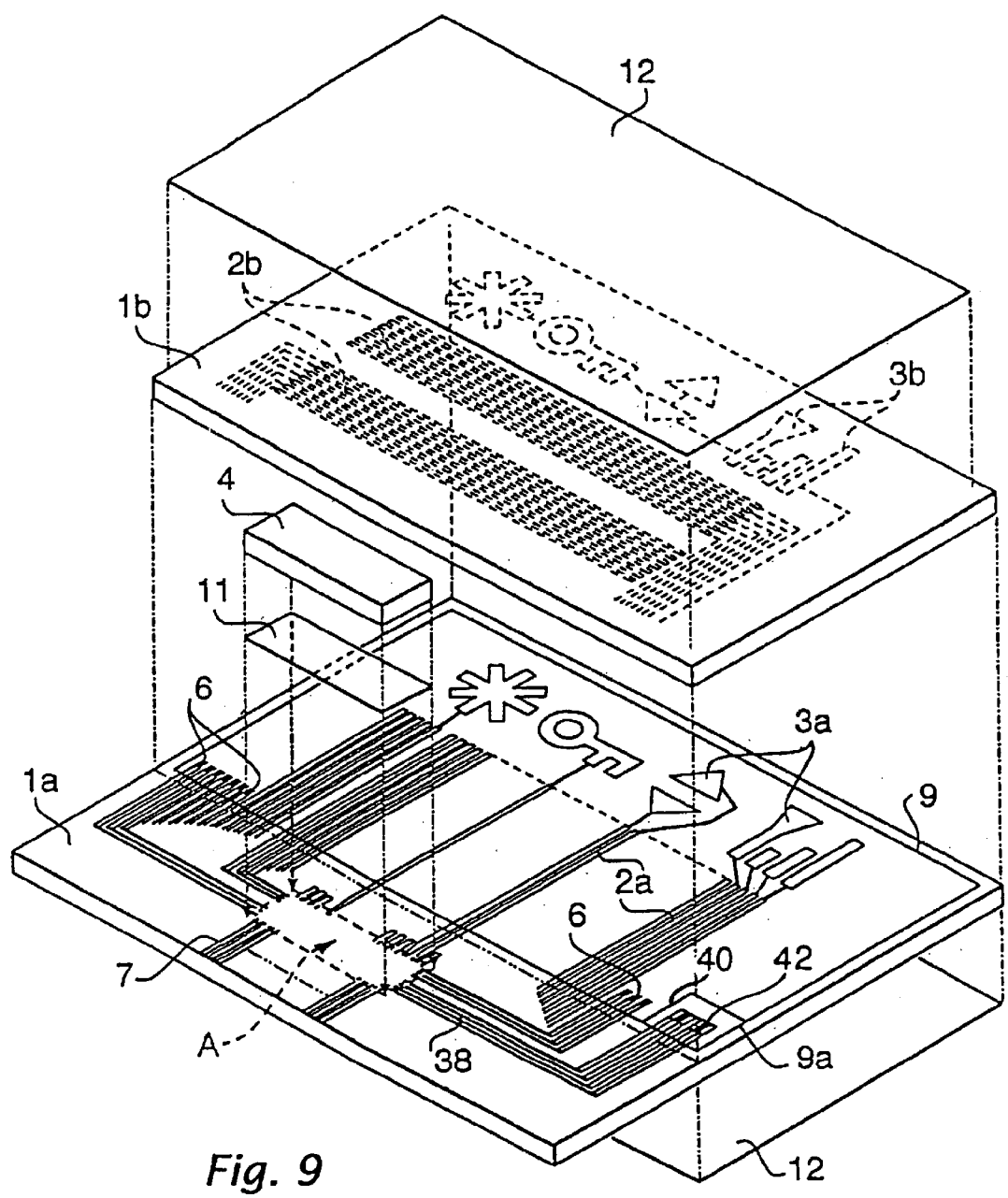
FIG. 9 is an exploded perspective view showing a still further embodiment of the liquid crystal display device according to the present invention.

FIG. 9 shows a still further embodiment of the liquid crystal display device according to the present invention. In the embodiment, the same numerals as used in the embodiment shown in FIG. 1 are used to denote the same parts and the description of the parts is omitted when they were described previously.

In the embodiment, external connecting terminals 7 are formed on the input terminal side of an IC mounting region A by ITO to make electrical communication with an external circuit. Further, resistance elements, for example, carbon printed resistors 40 are formed to the extreme ends of an ITO patterns 38 extending from a position corresponding to the resistor connecting terminal of a liquid crystal driving IC 4. The resistors 40 operate, as an electro-circuit, to impose external voltages supplied from the external connecting terminals 7 on the liquid crystal driving IC 4 as operating voltages after dropping the external voltages in accordance with the resistance values thereof. The external connecting terminals 7 and the ITO patterns 38 are formed simultaneously with the formation of electrodes 2a, 3a on a transparent substrate 1a. The printed resistors 40 are formed at a suitable timing after or before the ITO patterns 38 are formed.

When the stripe-shaped electrodes 2a, the pattern-shaped electrodes 3a, the external connecting terminals 7, the ITO pattern 38 and the resistors 40 are formed on one of transparent substrates 1a and further stripe-shaped electrodes 2b and pattern-shaped electrodes 3b are formed on another transparent substrate 1b, alignment films are further formed on the transparent substrates and the respective transparent substrates are subjected to alignment processing, for example, lapping processing.

Thereafter, a seal material 9 is annularly formed on one of the transparent substrates, for example, the transparent substrate 1a by screen printing in such a manner that the region where the resistors 40 are formed is located externally of the annular seal material 9 and further the periphery of the resistors 40 is surrounded by a second seal material 9a. Subsequently, spacers such as beads or the like are dispersed on the transparent substrate 1a and then the pair of transparent substrates 1a, 1b are superposed on each other so that the stripe-shaped electrodes 2a are perpendicular to the stripe-shaped electrodes 2b and they are jointed to each other by the seal material 9 and the second seal material 9a.

Subsequently, liquid crystal is charged into a space formed between the transparent substrate 1a and the transparent substrate 1b, that is, to a so-called cell gap. At the time, the liquid crystal is not charged into the cell partitioned by the second seal material 9a which surrounds the resistors 40, although the liquid crystal is sealed in the inside region of the seal material 9. Next, the liquid crystal driving IC 4 is bonded to the IC mounting region A of the transparent substrate 1a using an ACF 11 to thereby conductively connect the respective bumps of the liquid crystal driving IC 4 to corresponding electrode terminals on the transparent substrate 1a.

Figure 10:
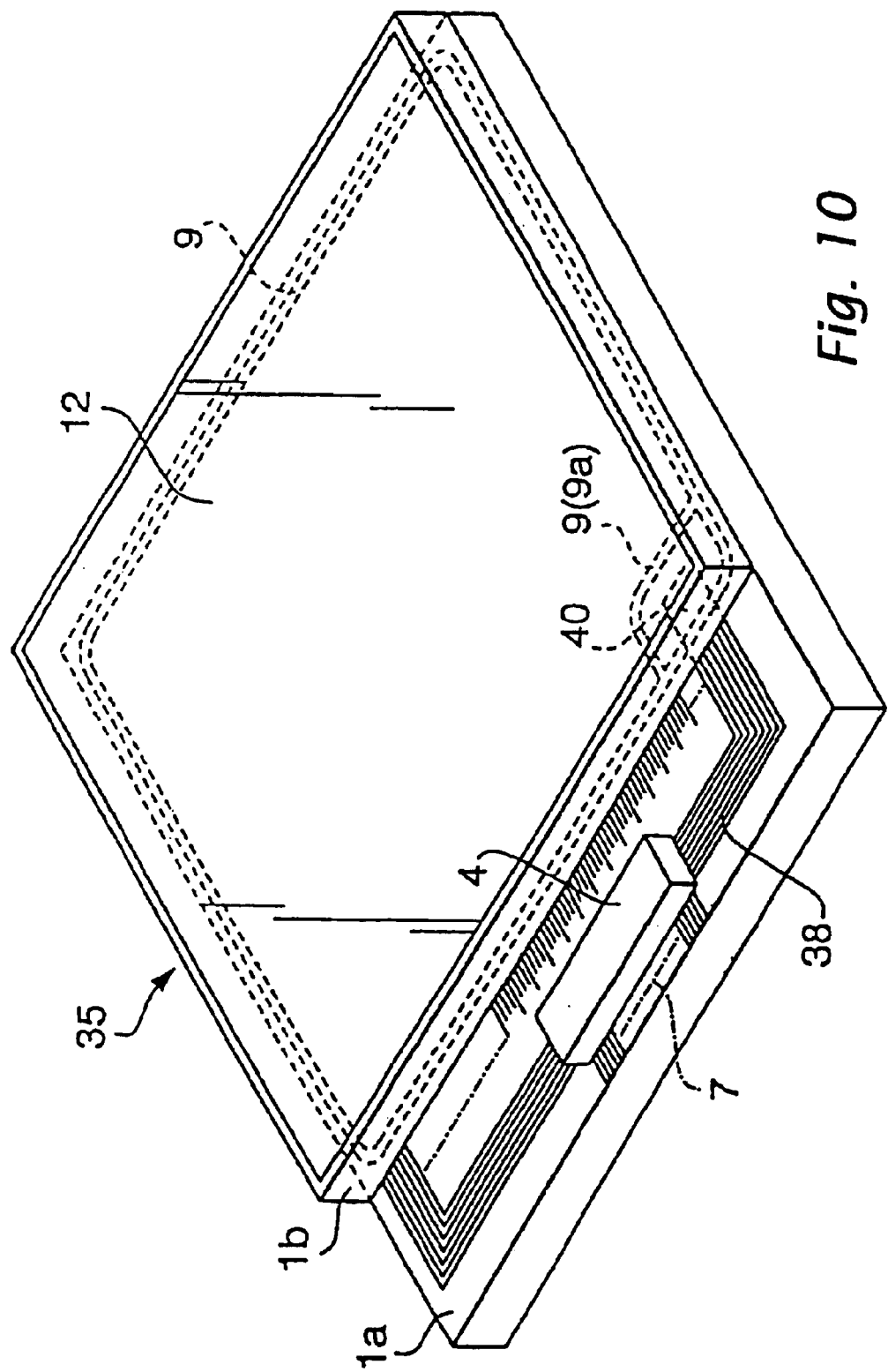
FIG. 10 is a perspective view showing a state after the embodiment shown in FIG. 9 is assembled.

With the above arrangement, a liquid crystal panel on which the liquid crystal driving IC 4 is mounted is formed and further a liquid crystal display device 35 as shown in FIG. 10 is completed by bonding polarizers to the outside surfaces of the transparent substrates 1a, 1b. In the liquid crystal display device 35, a back light unit is attached externally of the transparent substrate 1a or the transparent substrate 1b when necessary. In the liquid crystal display device 35 of the subject embodiment, since a voltage dividing circuit including the resistors 40 is provided as the peripheral circuit of the liquid crystal driving IC 4, even if an external voltage, which is supplied from external equipment, for example, a portable telephone, through the external connecting terminals 7, is fixed to a given value, the external voltage can be changed by the resistors 40. Therefore, proper operation voltages can be supplied to the liquid crystal driving IC 4 at all times, whereby proper switching voltages can be imposed on the respective pixel liquid crystals in the liquid crystal display device.

Moreover, in the subject embodiment, since the peripheral circuit including the resistors 40 is disposed on the main body portion of the liquid crystal panel, that is, to a portion sandwiched between the pair of transparent substrates 1a, 1b, instead of being disposed on the objecting portion of the transparent substrate 1a, the size of the objecting portion of the transparent substrate 1a need not be increased. Further, it is not necessary to employ such a 1a and troublesome structure that a transit PCB is connected to the external connecting terminal 7 of the liquid crystal panel and resistance elements are assembled on the transit PCB. As a result, the overall dimension of the embodiment can be greatly reduced regardless of that the peripheral circuit is included in the liquid crystal display device.

(Modified Embodiment)

The voltage dividing circuit using the printed resistors 40 as the peripheral circuit is contemplated in the embodiment of FIG. 9. However, a peripheral circuit applicable thereto may include any arbitrary electronic elements other than the resistance element, for example, capacitors 42. The employment of the peripheral circuit including the capacitors can stabilize the voltage output from the liquid crystal diving IC and generate a voltage having other value at internal of the liquid crystal drying IC, by utilizing a voltage input to the input terminal of the liquid crystal drying IC. To form the capacitors in a narrow gap formed between the pair of transparent substrates, the electrodes of the confronting substrates can be connected to each other by upper/lower conductors likewise the stripe-shaped electrodes for driving the liquid crystal, although a dielectric may be or may not be sandwiched between confronting ITOs.

(Sixth Embodiment)

Figure 11:
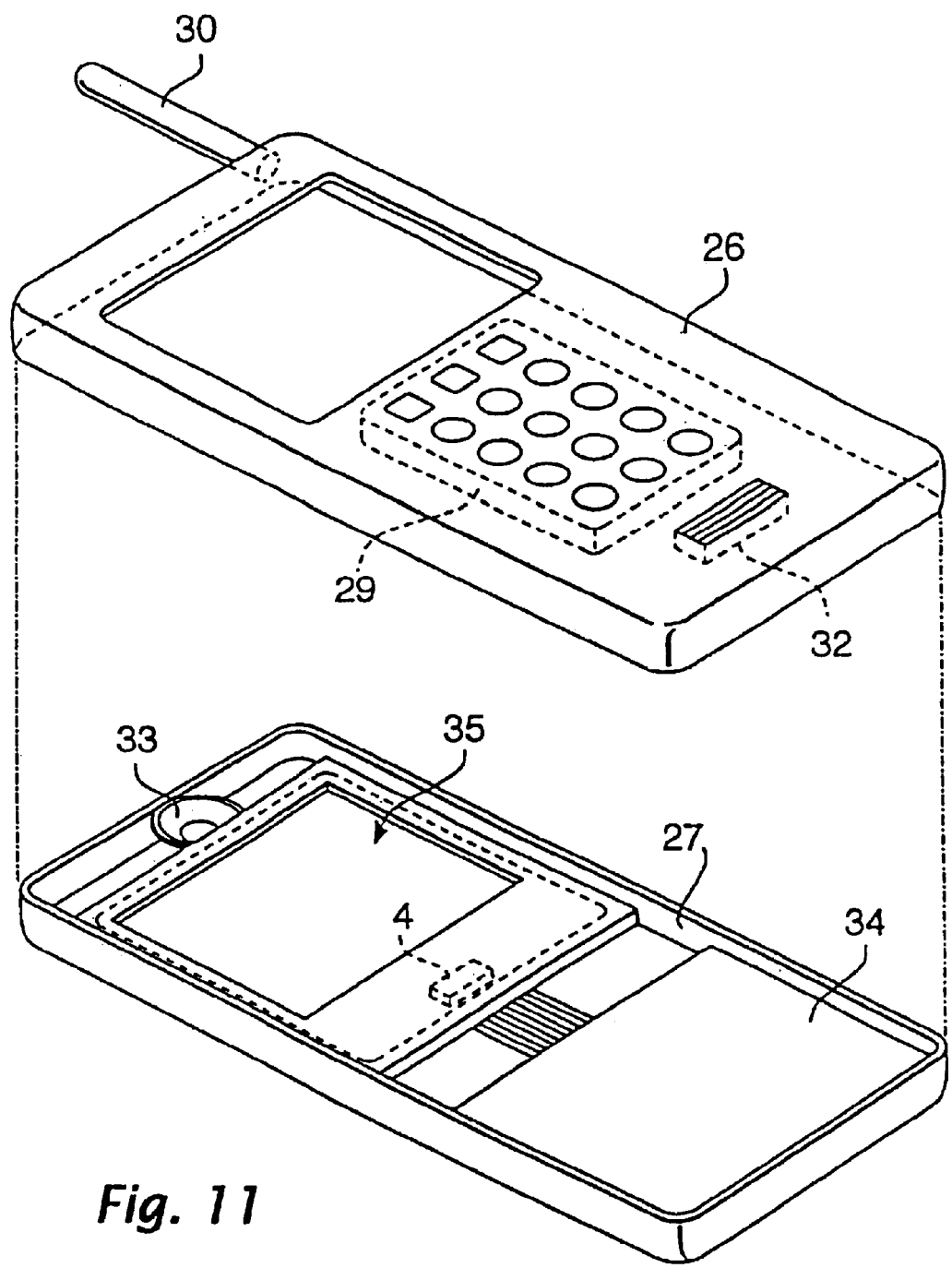
FIG. 11 is an exploded perspective view of an embodiment of electronic equipment according to the present invention.

FIG. 11 shows an embodiment when the liquid crystal display device according to the present invention is used as a display unit of a portable telephone as electronic equipment. The portable telephone shown here comprises an upper case 26 and a lower case 27. The upper case 26 includes a transmitting/receiving antenna 30, a keyboard unit 29 and a microphone 32. The lower case 27 includes a liquid crystal display device 35 shown in, for example, FIG. 10, a speaker 33 and a circuit board 34.

Figure 12:
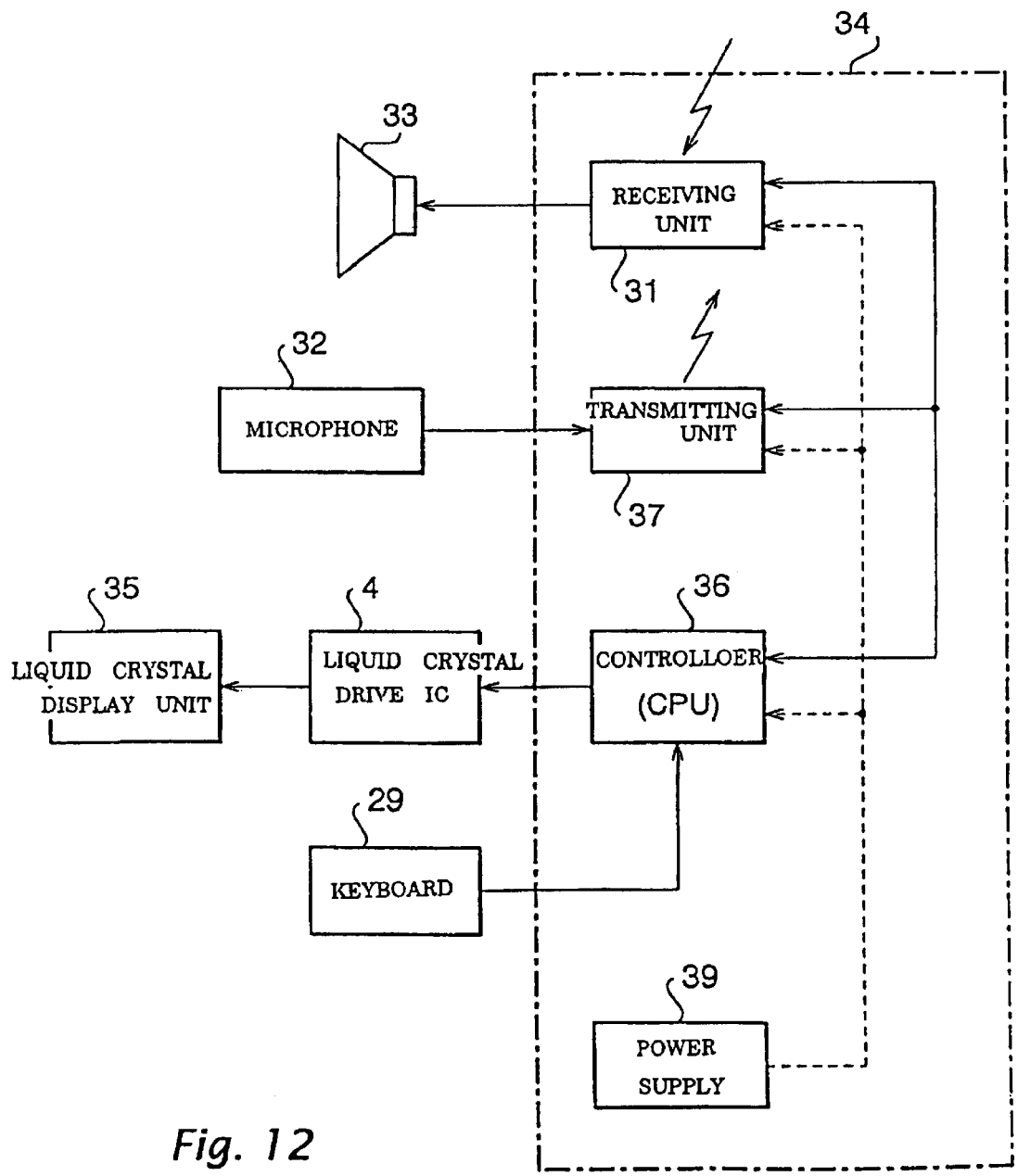
FIG. 12 is a block diagram of an electric control system used to the electronic equipment of FIG. 11.

As shown in FIG. 12, there are disposed on the circuit board 34 a receiving unit 31 connected to the input terminal of the speaker 33, a transmitting unit 37 connected to the output terminal of the microphone 32, a controller 36 composed of a CPU and the like and a power supply 39 for supplying power to the respective units. The controller 36 reads the states of the transmitting unit 37 and the receiving unit 31 and supplies information to a liquid crystal driving IC 4 base on the read result to thereby display visible information on the effective display region of the liquid crystal display device 35. Further, the controller 36 supplies information to the liquid crystal driving IC 4 based on the information output from the keyboard unit 29 to thereby display a visible information on the effective display region of the liquid crystal display device 35.

(Other Embodiments)

While the present invention has been described with reference to the preferable embodiments, it is by no means limited thereto and various modifications and changes can be made within the scope of the invention disclosed in the annexed claims.

For example, as to the liquid crystal display device of the present invention, the present invention is also applicable to a liquid crystal display device of any arbitrary system, for example, a liquid crystal display device of a TAB system in addition to the liquid crystal display device of the COG system shown in FIG. 1 to FIG. 4. Although the respective embodiments employ the light transmitting (transparent) substrate, the substrate may be not transparent. Further, the present invention is also applicable to a liquid crystal display device of an active matrix type when necessary.

As to the electronic equipment of the present invention, although the embodiment shown in FIG. 11 exemplifies a case that the liquid crystal display device of the present invention is applied to the visible image display unit of the portable telephone, it is needless to say that the present invention is applicable to any arbitrary electronic equipment other than the portable telephone, for example, a finder of a video camera and the like.

Industrial Applicability

The liquid crystal display device of the present invention can be preferably used as a visible image display unit of electronic equipment such as a portable telephone, a video camera and the like. The method of manufacturing the liquid crystal display device according to the present invention can be preferably used to manufacture a liquid crystal display device of this type having a small overall dimension. Further, the electronic equipment according to the present invention is effective as various types of electronic equipment provided with a display unit for displaying visible images such as characters, numerals, pictures and the like.

What is claimed is:

1. A liquid crystal display device for displaying a visible image by controlling an alignment of a liquid crystal disposed between a pair of substrates by imposing a drive voltage on the liquid crystal through at least one electrode, comprising:
    a driving integrated circuit (IC) mounted on one of the pair of substrates, the driving integrated circuit operable to supply the drive voltage to the at least one electrode; and
    a resistance element disposed on at least one of the pair of substrates, and electrically connected to the driving IC, wherein a resistance value of said resistance element is capable of being set by partially removing the material of the resistance element, wherein an input voltage for operating the driving IC is capable of being varied depending on the resistance value of the resistance element and the drive voltage is capable of being varied depending on the value of the input voltage.

2. A liquid crystal display device according to claim 1, wherein said resistance element is formed by ITO (indium tin oxide).

3. The liquid crystal display device of claim 1 wherein the resistance element having the same material as that of the at lease one electrode and formed to a prescribed pattern.

4. A method of manufacturing a liquid crystal display device for displaying a visible image by controlling an alignment of a liquid crystal disposed between a pair of substrates by imposing a drive voltage on the liquid crystal through at least one electrode, wherein the method is comprised of the following steps of:
    mounting a driving integrated circuit (IC) on at least one of the pair of substrates, the driving IC operable to supply the drive voltage to the at least one electrode;
    forming a resistance element on at least one of the pair of substrates, the resistance element being electrically connected to the driving IC, and
    partially removing the material of the resistance element so as to adjust a resistance value of the resistance element so as to adjust an input voltage for operating the driving IC, wherein the drive voltage is varied based on the value of the input voltage.

5. The liquid crystal display device of claim 4 wherein the resistance element having the same material as that of the at lease one electrode and formed to a prescribed pattern.

6. A liquid crystal display device comprising:
    a first substrate;
    a second substrate opposite said first substrate;
    a liquid crystal disposed between said first and second substrates;
    a plurality of electrodes disposed on at least one of the substrates,
    wherein a drive voltage imposed on the liquid crystal through at least one of the plurality of electrodes;
    a driving integrated circuit (IC) mounted on at least one of the substrates and operable to supply the drive voltage to the at least one of the plurality of electrodes; and
    a resistance element, disposed on one of said first and second substrates, and electrically connected to the driving IC, wherein a resistance value of said resistance element is capable of being set by partially removing the material of the resistance element, wherein an input voltage for operating the driving IC is capable of being varied depending on the resistance value of the resistance element and the drive voltage is capable of being varied depending on the value of the input voltage.

7. The liquid crystal display device of claim 6 further comprising: a plurality of electrodes formed on said first and second substrates, said electrodes being formed of the same material as said resistance element.

8. The liquid crystal display device of claim 6 wherein said adjustable resistance value of said resistance element is controlled by a pattern of said resistance element.

9. The liquid crystal display device of claim 6 further comprising a seal formed between said first and second substrates.

10. The liquid crystal display device of claim 9 further comprising a peripheral circuit disposed between said first and second substrates outboard of said seal.

11. The liquid crystal display device of claim 10 further comprising a second seal formed between said first and second substrates outboard of said peripheral circuit.

12. The liquid crystal display device of claim 10 wherein said peripheral circuit includes at least one of a resistance element and a capacitor.

13. The liquid crystal display device of claim 6 wherein the resistance element having the same material as that of the at lease one electrode and formed to a prescribed pattern.

14. A liquid crystal display device for displaying a visible image, comprising:
- a first substrate;
- a second substrate opposite said first substrate;
- a liquid crystal disposed between said first and second substrates;
- a plurality of electrodes disposed on at least one of the substrates,
wherein a drive voltage is imposed on the liquid crystal through at least one of the plurality of electrodes;
- a driving integrated circuit (IC) mounted on one of the substrates and operable to supply the drive voltage to the at least one of the plurality of electrodes; and
- a resistance element disposed on at least one of said first and second substrates, and electrically connected to the driving IC, wherein a the resistance value of said resistance element is capable of being set by partially removing the material of the resistance element, wherein an input voltage for operating the driving IC is capable of being varied depending on the resistance value of the resistance element and the drive voltage is capable of being varied depending on the value of the input voltage, thereby changing the voltage applied to the liquid crystal.

15. The liquid crystal display device of claim 14 wherein said liquid crystal is connected by said plurality of electrodes to said liquid crystal driving IC.

16. The liquid crystal display device of claim 14 wherein said resistance element connected to one or more input terminals of said liquid crystal driving IC and said plurality of electrodes connected to a plurality of output terminals of said liquid crystal driving IC.

17. The liquid crystal display device of claim 14 wherein said adjustable resistance value of said resistance element is controlled by a pattern of said resistance element.

18. The liquid crystal display device of claim 14, further comprising a seal formed between said first and second substrates.

19. The liquid crystal display device of claim 14 wherein the resistance element having the same material as that of the at lease one electrode and formed to a prescribed pattern.

20. A liquid crystal display device for displaying a visible image, comprising:
- a first substrate;
- a second substrate opposite said first substrate;
- a liquid crystal disposed between said first and second substrates;
- a liquid crystal driving integrated circuit (IC) mounted on one of the first and second substrates and operable to impose voltage on said liquid crystal; and
- a capacitor located between the first and second substrates, connected to said liquid crystal driving IC for stabilizing the voltage imposed on said liquid crystal.

21. A liquid crystal display device for displaying a visible image, comprising:
- a first substrate;
- a second substrate opposite said first substrate;
- a liquid crystal disposed between said first and second substrates;
- a liquid crystal driving integrated circuit (IC) mounted on one of the first and second substrates and operable to impose voltage on said liquid crystal; and
- a capacitor located between the first and second substrates, connected to said liquid crystal driving IC for generating voltages imposed on the liquid crystal.

22. A display device comprising;
- a substrate;
- a driving IC, mounted on the substrate, for driving the display device; and
- a resistance element disposed on the substrate and electrically connected to the driving IC, wherein a resistance value of said resistance element is capable of being set by partially removing the material of the resistance element, wherein a voltage for operating the IC is varied depending on the resistance value of the resistance element.

23. The liquid crystal display device of claim 22 wherein the resistance element having the same material as that of the at lease one electrode and formed to a prescribed pattern.

24. A liquid crystal display device for displaying a visible image by controlling an alignment of a liquid crystal disposed between a pair of substrates by imposing a drive voltage on the liquid crystal through at least one electrode, comprising:
- a driving integrated circuit (IC) mounted on one of the pair of substrates, the driving integrated circuit operable to supply the drive voltage to the at least one electrode; and
- a resistance element having an adjustable resistance value, disposed between the pair of substrates and disposed on at least one of the pair of substrates, and electrically connected to the driving IC, wherein an input voltage for operating the driving IC is capable of being varied depending on the resistance value of the resistance element and the drive voltage is capable of being varied depending on the value of the input voltage.

25. A method of manufacturing a liquid crystal display device for displaying a visible image by controlling an alignment of a liquid crystal disposed between a pair of substrates by imposing a drive voltage on the liquid crystal through at least one electrode, wherein the method is comprised of the following steps of:
- mounting a driving integrated circuit (IC) on at least one of the pair of substrates, the driving IC operable to supply the drive voltage to the at least one electrode;
- disposing a resistance element having an adjustable resistance value on at least one of the pair of substrates, the resistance element being electrically connected to the driving IC, the resistance element disposed between the pair of substrates; and
- adjusting the resistance value of the resistance element so as to adjust an input voltage for operating the driving IC, wherein the drive voltage is varied depending on the value of the input voltage.

26. A liquid crystal display device for displaying a visible image comprising:
- a first substrate;
- a second substrate opposite the first substrate;
- a driving integrated circuit (IC) mounted on one of the first and second substrates and operable to impose a drive voltage on a liquid crystal;
- a resistance element disposed on one of the first and second substrates and electrically connected to the driving IC, the resistance value of the resistance element being capable of being set by partially removing material of the resistance element, the drive voltage imposed on the liquid crystal by the driving IC being set depending on the resistance value of the resistance element.

* * * * *

UNITED STATES PATENT AND TRADEMARK OFFICE
CERTIFICATE OF CORRECTION

PATENT NO. : 6,954,249 B2
APPLICATION NO. : 09/202107
DATED : October 11, 2005
INVENTOR(S) : Eiji Muramatsu, Shigetoshi Yamada and Minoru Ikegami It is certified that error appears in the above-identified patent and that said Letters Patent is hereby corrected as shown below:

Column 3, Line 5:         "amounted" should be -- mounted --

Column 3, Line 34:        after "driving" insert -- IC. --

Column 6, Line 26:        "to" should be -- in --

Column 10, Line 34        "1a" should be -- large --

Column 10, Line 48:       "diving" should be -- driving --

Column 10, Line 50:       "drying" should be -- driving --

Column 10, Line 51:       "drying" should be -- driving --

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,954,249 B2  
APPLICATION NO. : 09/202107  
DATED : October 11, 2005  
INVENTOR(S) : Eiji Muramatsu, Shigetoshi Yamada and Minoru Ikegami It is certified that error appears in the above-identified patent and that said Letters Patent is hereby corrected as shown below:

Column 3, Line 5: "amounted" should be -- mounted --

Column 3, Line 34: after "driving" insert -- IC. --

Column 6, Line 26: "to" should be -- in --

Column 10, Line 34: "1a" should be -- large --

Column 10, Line 48: "diving" should be -- driving --

Column 10, Line 50: "drying" should be -- driving --

Column 10, Line 51: "drying" should be -- driving --

Column 11, Line 8: "base" should be -- based --

Column 12, Line 8: "lease" should be -- least --

Column 12, Line 26: "lease" should be -- least --

Column 13, Line 3: "lease" should be -- least --

Column 13, Line 42: "lease" should be -- least --

Column 14, Line 15: "lease" should be -- least --

This certificate supersedes Certificate of Correction issued August 22, 2006.

Signed and Sealed this

Third Day of April, 2007

JON W. DUDAS  
*Director of the United States Patent and Trademark Office*